UNITED STATES PATENT OFFICE.

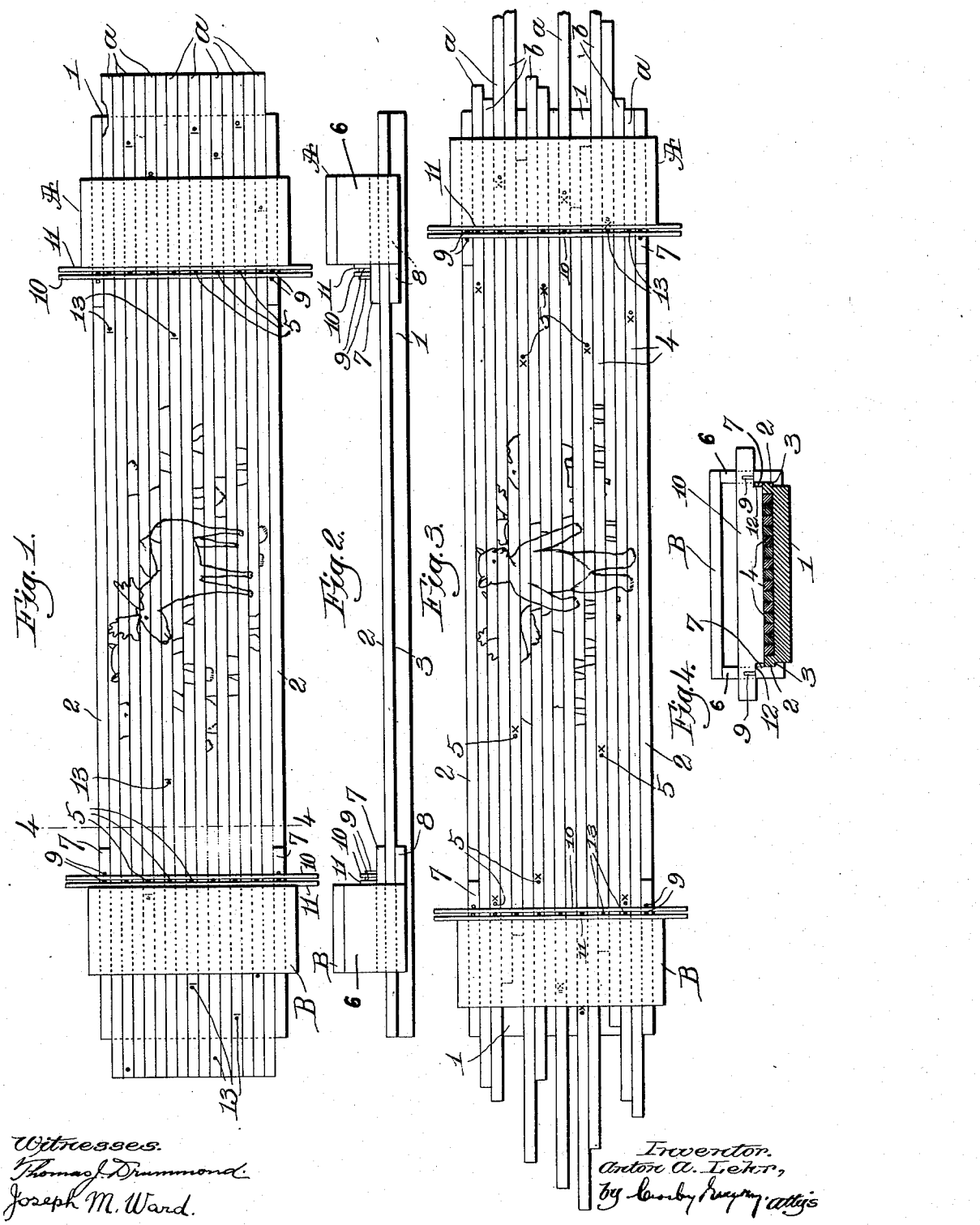

ANTON A. LEHR, OF BOSTON, MASSACHUSETTS.

GAME APPARATUS.

No. 845,798.   Specification of Letters Patent.   Patented March 5, 1907.

Application filed December 24, 1906. Serial No. 349,296.

*To all whom it may concern:*

Be it known that I, ANTON A. LEHR, a citizen of the United States, and a resident of Boston, county of Suffolk, State of Massachusetts, have invented an Improvement in Game Apparatus, of which the following description, in connection with the accompanying drawing, is a specification, like letters on the drawing representing like parts.

This invention has for its object the production of an apparatus for playing an amusing, interesting, and instructive game, the educational features of the game being not the least of its characteristics.

In accordance with my invention I provide a playing-surface composed of a series of separate members placed side by side and independently movable in a longitudinal direction, the upper or exposed faces of said members lying in the same plane and presenting a smooth flat display-surface. Upon such surface I make in any suitable manner a plurality of designs differing from each other and of any desired character, but preferably in outline, so arranged that when any one design is presented in its completed form none of the other designs can be distinguished. The several members which present the display-surface are provided with suitable indicators, an indicator on each member for each design, all the indicators for one design being distinguished in a suitable way from the indicators of every other design of the set. By moving the members in one or the other direction until a given group of indicators is brought into a predetermined position or relation the design corresponding thereto will be displayed in its entirety and that design only. Then by selecting another group of indicators and properly positioning them the first design will be broken up or disintegrated and the proper design corresponding to the second group of indicators will be displayed in its completed form. So far as the particular character of the designs is concerned, the number of designs in a set, or the number and size of the movable members by which the designs are displayed any or all of such features may be changed or varied as may be desired by the maker of the apparatus without departing in any way from the scope and spirit of my invention.

In the present embodiment of my invention I have illustrated a set of two designs and their accompanying indicators for purposes of explanation and illustration only, and the various novel features of my invention will, in connection with the drawings, be described in the subjoined specification and particularly pointed out in the appended claims.

Figure 1 is a top plan view of a game apparatus embodying one form of my invention, the movable members constituting the display-surface being positioned to show completed one design of the set. Fig. 2 is a front elevation of the apparatus. Fig. 3 is a view similar to Fig. 1, but showing the movable members arranged to display completed the other design of the set. Fig. 4 is a transverse section on the line 4 4, Fig. 1, looking toward the left.

In the present embodiment of my invention I provide an elongated flat base 1, herein shown as considerably longer than wide and provided along each of its longitudinal edges with upturned parallel flanges 2 2, the base being undercut below the flanges to leave overhanging shoulders 3. Between the flanges and resting upon the flat top of the base I mount a series of elongated narrow members 4, rectangular in section and of preferably equal width and thickness, so that the flat upper faces of said members lie in the same plane and present a flat display-surface. Said members 4 are placed side by side and in juxtaposition, but fitting between the flanges 2 loosely enough to enable said members to be easily moved longitudinally and individually. Herein I have shown fifteen of the members 4; but the particular number is immaterial so far as concerns my invention. Preferably I divide the series of members into two subseries, the members of one (indicated at $a$, Figs. 1 and 3) alternating with the members of the other series, as $b$, for a purpose to be made plain hereinafter.

Referring now to Fig. 1, let it be supposed that all of the members are brought into position with their ends alined. I then draw, stamp, imprint, or otherwise form upon the display-surface a suitable design, herein shown as a moose and in outline. I now provide the members 4 with a set or group of indicators, which are preferably pins or upright studs 5, and for the subseries $a$ I place the indicators in a straight line transverse to the display-surface and at the right viewing Fig. 1. Similarly for the subseries $b$ the indicators are placed in a straight line at the left, as shown, and some distinguishing-mark is made on each member, as a X. To facilitate handling the members in bringing out a design and also to govern all the members of each subseries simultaneously, I place on the base 1 two slides A B of like construction, but facing each other. Each slide has downturned sides 6, (see Figs. 2 and 4,) provided with parallel ribs 7 8 on their inner faces, the ribs 7 sliding upon the tops of the flanges 2 of the base and the ribs 8 engaging the shoulders 3 to thereby maintain the slides A and B in position on the base, while movable longitudinally thereupon. The ribs project beyond the inner sides of the slides, and upright pairs of pins 9 are inserted in the ribs 7 opposite each other. A pair of cross-pieces 10 11 are used with each slide in the present embodiment of my invention, each cross-piece being cut out at its ends, as at 12, Fig. 4, so that the narrow portions can rest upon the ribs 7 and the deeper portions upon or adjacent the faces of the members 4. Now when the indicators 5 of the subseries $a$ have been brought into line across the base the cross-piece 11 is inserted in place on the slide A at one side of the row of indicators, and the other cross-piece 10 is placed on the slide at the other side of the row of indicators, the pins 9 holding the cross-pieces in place. Similarly the cross-pieces for the slide B are placed in position with relation to the indicators 5 on the subseries $b$. By grasping the slides with the hands and moving them toward or from each other the members 4 of the two subseries $a$ and $b$ will be moved relatively to each other until they are so placed that the design is completed and displayed in its entirety.

It will be manifest from an inspection of Fig. 1 that if either or both of the slides A and B be moved to the right or left the design will be disintegrated or broken up. This feature adds to the interest of the game, for after the indicators have been properly positioned it is then necessary for the player to effect relative movement of the two subseries of members 4 until they are in proper relation to each other to display the design complete.

It will be observed that on Fig. 1 there are a number of apparently aimless marks or lines having no regular order or meaning; but they will when brought into proper relation display another completed design. Such second design is shown in its completed form in Fig. 3, and I have illustrated a standing bear as the subject of the second design, its indicators being the pins 13 and distinguished by a short straight line. When the indicators so distinguished are brought into proper position and the two subseries $a$ and $b$ are moved into proper relation by means of the slides A and B, the design of the bear is completed, as in Fig. 3, and the design of the moose is broken up, the various lines of which it is composed being shown in Fig. 3.

As many designs may be used as desired compatible with the limits of the display-surface and the corresponding groups of indicators, care being taken that no one design when completed shall interfere to any marked degree with a broken-up design. Whatever the number of designs there must be a corresponding number of groups of indicators, and the indicators of one group must be distinguished by some mark, sign, or otherwise from the indicators of all the other groups.

The construction of the slides and cross-pieces may be varied from that shown without departing from the spirit and scope of my invention.

Having fully described my invention, what I claim as new, and desire to secure by Letters Patent, is—

1. In a game apparatus, a series of longitudinally and independently movable members arranged side by side in parallelism and having a plurality of outline designs thereon, an indicator for each design, on each member, and means to effect proper positioning of the indicators of a kind, to thereby so locate the said members as to display in completed form only the design corresponding to such indicators.

2. In a game apparatus, a series of longitudinally and independently movable members arranged in juxtaposition side by side and having a plurality of designs thereon, and an indicator for each design, on each member, whereby when the members are moved to bring the indicators of a kind into predetermined position the design corresponding to such indicators will be displayed in complete form.

3. In a game apparatus, a series of longitudinally and independently movable members arranged in juxtaposition side by side and having flat upper faces lying in the same plane, presenting a display-surface upon which are made a plurality of designs, an indicator for each design, on each member, the indicators of one group being distinguished from the indicators of another group, and means whereby, when indicators of a group are alined, the corresponding members may be moved longitudinally in unison.

4. In a game apparatus, a flat base having parallel side flanges, a series of elongated, narrow and longitudinally-movable members arranged side by side upon the base between the flanges thereof, the upper, flat faces of the members lying in the same plane and having a plurality of designs thereupon, groups of indicators on said members, each group corresponding to a design and being distinguished from the indicators of the other groups, and means to retain in alined position the indicators of a group.

5. In a game apparatus, a flat base having parallel side flanges, a series of elongated, narrow and longitudinally-movable members arranged side by side upon the base between the flanges thereof, the upper, flat faces of the members lying in the same plane and having a plurality of designs thereupon, groups of indicators on said members, each group corresponding to a design and being distinguished from the indicators of the other groups, a slide movable longitudinally on the base, and means carried by the slide to retain in alined position indicators of a given group.

6. In a game apparatus, a flat base having parallel side flanges, a series of longitudinally and independently movable members arranged in juxtaposition side by side upon the base between the flanges and having their upper faces lying in the same plane, to present a display-surface having a plurality of designs thereon, said members being divided into two subseries, the members of one alternating with those of the other subseries, an indicator for each design, on each member, the indicators of one group being distinguished from those of other groups, two slides movable longitudinally on the base, and means on each slide to engage the indicators of a selected group on one of the subseries and maintain said indicators alined, whereby relative movement of the slides will effect corresponding movement of the respective members, to position the same to complete the design corresponding to the selected group of indicators.

In testimony whereof I have signed my name to this specification in the presence of two subscribing witnesses.

ANTON A. LEHR.

Witnesses:
 JOHN C. EDWARDS,
 ELIZABETH R. MORRISON.